United States Patent [19]

Sakashita et al.

[11] Patent Number: 5,251,087
[45] Date of Patent: Oct. 5, 1993

[54] HOLDER FOR MAGNETIC SENSITIVE ELEMENT

[76] Inventors: Hiroshi Sakashita; Norihide Yoshida; Tatemi Yoneda, all of c/o Kabushiki Kaisha Sankyo Seiki Seisakusho, Komagane Works, 14-888, Akaho, Komagane-shi, Nagano, Japan

[21] Appl. No.: 555,499
[22] PCT Filed: Feb. 10, 1989
[86] PCT No.: PCT/JP89/00132
§ 371 Date: Aug. 9, 1990
§ 102(e) Date: Aug. 9, 1990
[87] PCT Pub. No.: WO89/07751
PCT Pub. Date: Aug. 24, 1989

[30] Foreign Application Priority Data

Feb. 10, 1988 [JP] Japan .................. 63-27696

[51] Int. Cl.⁵ .............. G11B 5/56; G11B 21/24; H03M 1/22
[52] U.S. Cl. .................. 360/109; 360/104; 341/15
[58] Field of Search .......... 360/104, 105, 109, 106; 341/15

[56] References Cited

U.S. PATENT DOCUMENTS

| | | | |
|---|---|---|---|
| 2,861,134 | 11/1958 | Gernert | 360/109 |
| 3,235,671 | 2/1966 | Rich | 360/109 |
| 3,833,925 | 9/1974 | Jenkins | 360/109 |
| 3,940,796 | 2/1976 | Haun et al. | 360/109 |
| 4,003,092 | 1/1977 | Hirata | 360/109 |
| 4,086,638 | 4/1978 | Saito | 360/109 |
| 4,158,868 | 6/1979 | Jenkins | 360/109 |
| 4,287,543 | 9/1981 | Banks | 360/109 |
| 4,329,723 | 5/1982 | Schoenmakers | 360/109 |
| 4,340,918 | 7/1982 | Jansen | 360/109 |
| 4,605,978 | 8/1986 | Zeavin | 360/109 |
| 4,628,386 | 12/1986 | Chabrolle | 360/109 |
| 4,731,920 | 3/1988 | Nishijima et al. | 360/104 |
| 4,792,875 | 12/1988 | Ohdaira | 360/104 |
| 4,823,217 | 4/1989 | Kato et al. | 360/104 |

FOREIGN PATENT DOCUMENTS

| | | |
|---|---|---|
| 61-129527 | 6/1986 | Japan . |
| 61-165621 | 7/1986 | Japan . |
| 62-20313 | 2/1987 | Japan . |
| 62-158307 | 10/1987 | Japan . |

Primary Examiner—Stuart S. Levy
Assistant Examiner—Jefferson Evans
Attorney, Agent, or Firm—Welsh & Katz, Ltd.

[57] ABSTRACT

A holder for holding a magnetic sensitive element by which the magnetic sensitive element may be secured at a desired position so as to obtain favorable output characteristics and to reduce the area which the element occupies. The holder positions the magnetic sensitive element opposite a magnetic drum, within a magnetic encoder, and comprises a movable holder for holding a magnetic sensitive element connected to a flexible signal input/output member, a fixed holder fixed to a circuit board for holding the movable holder, and a guide which is biased against the movable holder to permit movement of the movable holder in a direction perpendicular to the magnetic sensitive surface of the magnetic sensitive element to a desired set position to thereby adjust the gap between the magnetic sensitive element and the magnetic drum.

14 Claims, 5 Drawing Sheets

HOLDER FOR MAGNETIC SENSITIVE ELEMENT

TECHNICAL FIELD

The present invention relates to a holder for holding a magnetic sensitive element to secure it at a predetermined position. More specifically, the present invention relates to a holder for magnetic sensitive elements which can be applied to a magnetic encoder.

TECHNICAL TERMS

In the specification of the present application, the term "holder" means a part for securing a magnetic sensitive element and includes signal lines for input/output terminals. The term "magnetic sensitive element" is what can be described as a magnetism sensor for detecting magnetic energy, and embraces a magneto-resistance element, a Hall element, a thin-film magnetic head and the like.

BACKGROUND ART

Conventionally, a magnetic sensitive element 4, which is used with a magnetic encoder or the like, is secured to a holder 11 as shown in FIG. 12, and so arranged therein as to opposingly face a magnetic drum with a predetermined gap provided therebetween. As disclosed in, for example, Japanese Utility Model Laid-Open Publication No. Sho. 62-20,313, the holder 11 for such a magnetic sensitive element 4 comprises a positioning pin 11b and an adjustment slot 11a such that a machine screw 10 is inserted through the slot 11a with the pin 11b fitted into a positioning hole formed in a circuit board, thereby securing the holder 11 to the circuit board. The gap between the magnetic drum and the holder 11 can be adjusted by utilizing the slot 11a. Another type of holder is known in which, as shown in FIG. 13, an H-shaped separable holder 13, having the magnetic sensitive element 4 secured thereto, is combined with a fixed holder 12 having a pair of right and left guide walls 12a and a pair of right and left grooves 12b, the H-shaped separable holder 13 being fitted vertically in between the guide walls 12a and the grooves 12b. This holder is also arranged to enable the aforesaid gap to be adjusted by moving the fixed holder 12 per se via right and left slots 12c formed in the fixed holder 12. The holder disclosed in Japanese Patent Laid-Open Publication No. Sho. 61-165,621 is, as shown in FIG. 18, separated into a movable holder 14 in which is secured a magnetic sensitive element and a fixed holder 15 for holding the movable holder 14. The movable holder 14 is movably accommodated in the fixed holder 15, and to move the movable holder 14 forwardly and backwardly via a gap adjustment screw 16 and spring 17 will effect a positional adjustment of the movable holder 14 relative to the fixed one 15.

However, if the slot 11a or 12c is to be formed which allows the holder 11 or 12 to be secured to the circuit board or the like so that the holder 11 or 12 can be moved for fine adjustment, it is necessary to form the holder into a shape projecting in the rightward and leftward directions. This results in disadvantage that it is impossible to miniaturize the holder because of the increased holder size. The holder shown in FIG. 18 also has the problem that the holder size increases since screw-mounting holes 18 for securing the fixed holder 15 to the board need to be formed on right and left sides. As a result, such a holder occupies a wide area on the board. Another problem is that costs increase since the machine screw 10 is used for securing the holder to the board and thus such working step as a tapping is needed. The arrangement in which the movable holder 14 is moved for adjustment by means of the gap adjustment screw 16 has the disadvantage that an extremely complicated and large structure is needed for accommodating the adjustment screw 16 and the spring 17.

As shown in FIG. 14, the magneto-resistive element 4 has a resistance pattern which is generally formed by a plurality of resistors $R_1$, $R_2$, $R_3$ and $R_4$. It is desirable that this resistance pattern, which faces towards a magnetic drum 8, should be disposed parallel to a tangent T extending to touch one point closest to the center of the magnetic sensitive surface 4a of a magnetic recording medium 9 secured to the magnetic drum 8. With the magnetic sensitive element 4 inclined by an angle $\theta$ with respect to the magnetic recording medium 9, the resistor $R_1$, closest to the magnetic recording medium 9, is exposed to the strongest magnetic field, while the resistor $R_4$, the most remote from the magnetic recording medium 9, is exposed to the weakest magnetic filed. This can also be seen from FIG. 15 which shows the effective magnetic filed strength of the magnetic sensitive element 4 with respect to the gap between the magnetic recording medium and the magnetic sensitive element 4. However, turning to FIG. 12, the holder structure is such that adjustment of the gap is performed by means of the positioning pin 11b and slot 11a, according to which, the magnetic sensitive surface 4a is inclined by angle of $\theta$ relative to a plane T parallel to the tangent T, with movement of the holder 11 for the gap widening purpose, and consequently the resistance pattern is not set in parallel with the magnetic sensitive surface 4a. The holder structure as in FIG. 13, which has the slots 12c on the right and left sides, has a similar problem in that it is difficult to move the magnetic sensitive element 4 in parallel. In the case of the holder structure of FIG. 18 in which the movable holder 14 is moved for fine adjustment and secured in position by using the adjustment screw 16, since the movable holder 14 is not fixed to the fixed holder 15, the position or the inclination of the movable holder 14 may be shifted due to various factors such as vibration or a change in the position or the direction in which the elastic force of the spring 17 is to be imparted. This may possibly lead to a deterioration in output characteristics.

The resistors $R_1$ to $R_4$ are generally connected together as shown in FIG. 16, and, if difference occurs in magnetic field strength among those resistors, an A-phase output becomes larger than a B-phase output. In addition, difference also occurs in sensitivity among the resistors $R_1$ to $R_4$, affecting resulting output waveform to show a biased ratio of the positive part to negative part in that waveform and producing the fluctuation of an output signal due to jitters. The smaller is the magnetizing pitch of the magnetic recording medium, the more serious becomes such output problem. Hence, in this particular prior art, with increase of the angle $\theta$ between the magnetic sensitive surface 4a and the tangent T (or the parallel plane $T_1$) associated with the magnetic recording medium 9, several electrical characteristics involved are more subject to enormous variations. Such is the case as shown in FIG. 17, wherein, as the angle $\theta$ is greater, a resulting waveform is shown to be distorted by the solid line d in reference to a dashed line c indicative of "$\theta \approx 0$", which means deterioration of the output characteristics involved.

DISCLOSURE OF THE INVENTION

It is an object of the present invention to provide a holder for magnetic sensitive elements in which a fixed holder is so miniaturized and simplified as to provide a reduced area to be occupied by the magnetic sensitive element and attain good output characteristics.

A holder for magnetic sensitive elements according to the present invention comprises: a movable holder for holding a magnetic sensitive element to which a flexible signal input/output member is connected; a fixed holder fixed to a board for holding the movable holder; and guide means for guiding the movable holder for movement in one direction with arrangement that a guide portion formed on the fixed holder is given an elasticity so as to elastically urge a guide portion formed on the movable holder between the fixed holder and the movable holder characterized in that, a direction of movement of the movable holder being made the same as the direction perpendicular to the magnetic sensitive surface of the magnetic sensitive element.

Accordingly, in an arrangement where the holder for magnetic sensitive elements according to the present invention is disposed in opposition to the magnetic drum or the like, by mounting the fixed holder on the board so that a moving axis at the center of the magnetic sensitive surface of the movable holder coincides with an arbitrary normal of the magnetic drum, a tangent which extends to touch one point which is the closest to the holder for the magnetic recording medium is made parallel to the magnetic sensitive surface, and the magnetic sensitive surface moves parallel to the aforesaid tangent. Accordingly, gap adjustment can be easily accomplished and A- and B-phase outputs can be made uniform. It is therefore possible to improve output characteristics while reducing variations in characteristics. The holder according to the present invention is separated into the movable holder including the flexible signal input/output member and the fixed holder. Accordingly, if the fixed holder is formed as a solderable chip, the fixed holder can be automatically mounted on a circuit board together with another circuit element by a chip mounter or the like, whereby connection can be easily achieved by soldering or the like and an improvement in productivity and a great reduction in the cost of assembly can be achieved. In addition, according to the present invention, it is not necessary to make the holder partially project to the right and left sides for the purpose of forming screw-mounting holes for securing the fixed holder to the board, whereby the entire holder can be miniaturized and the area occupied by the holder can be reduced. In addition, since parts such as adjustment screws or springs for moving the movable holder for fine movement are not needed, a simple, small and inexpensive structure can be adopted. According to the invention, the fixed holder is formed from a metallic plate and thus the holder is not only of a certain rigidity of an unchangeable hard nature but also allows for being formed into a very thin structure. Further, the area of the fixed holder may suffice if it is equal to that of the movable holder, which render smaller the entire size of the holder.

Furthermore, in the present invention, if the fixed holder 2 is formed from a magnetic metallic sheet, this serves as a magnetic shield. Accordingly, when the holder is used in a motor or the like, it is possible to suppress magnetic noise generated from a driving magnet or other disturbance factors.

In another aspect of the invention, an adhesive reservoir is formed in an upper portion of the guide portion formed on the movable holder, and thus, by simply injecting an adhesive agent into the reservoir, the movable holder is fixed unmoved at a given position relative to the fixed holder.

In still another aspect, a holder, having the magnetic sensitive element retained thereon, is applied as elastic urging force from the fixed holder soldered on the circuit board, with the magnetic sensitive surface of the magnetic sensitive element being disposed opposite to a magnetic recording medium and a gap being provided therebetween.

BRIEF DESCRIPTION OF THE DRAWINGS

FIGS. 1 through 11 show embodiments of the present invention, wherein

FIG. 1 is a perspective view showing in assembled form one embodiment of a holder for magnetic sensitive elements, where the holder is shown as holding a magnetic sensitive element;

FIG. 2 is an exploded perspective view of the holder;

FIG. 3 is a plan view showing the holder for magnetic sensitive elements and a portion of a magnetic recording medium;

FIG. 4 is a cross-sectional side elevational view showing the essential portion of a movable holder;

FIG. 5 is a perspective view showing one example of a magnetic encoder to which the holder for magnetic sensitive holders according to the present invention is applied;

FIG. 6 is a side elevational view showing one embodiment which is mounted on a circuit board whose circuit pattern is formed on the reverse side;

FIGS. 7 to 9 show modifications;

FIG. 7 is a perspective view showing a modification in which a fixed holder is modified;

FIG. 8 is a perspective view showing another modification in which lead frames are modified;

FIG. 9 is a perspective view showing yet another modification in which lead frames are modified;

FIG. 10 is perspective view showing another embodiment in which a fixed holder is secured by a machine screw;

BEST MODE FOR CARRYING OUT THE INVENTION

Figure 1:
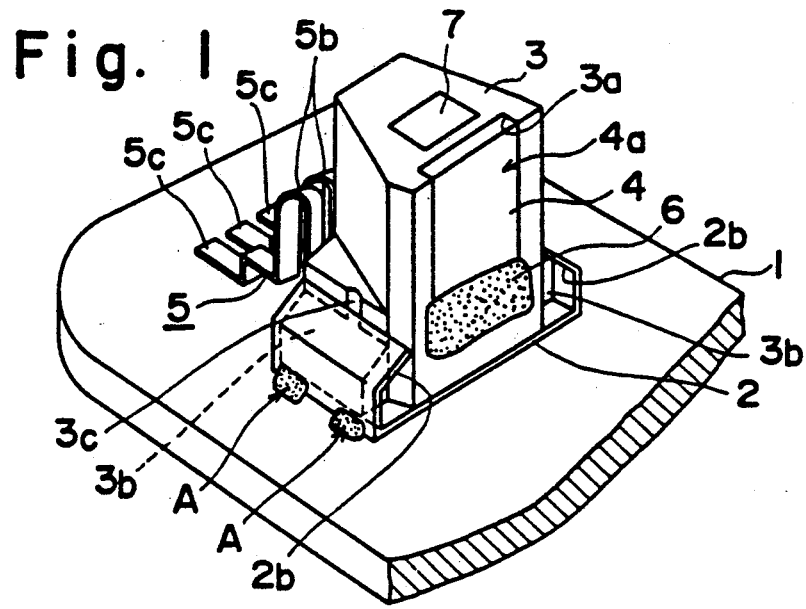
Figure 2:
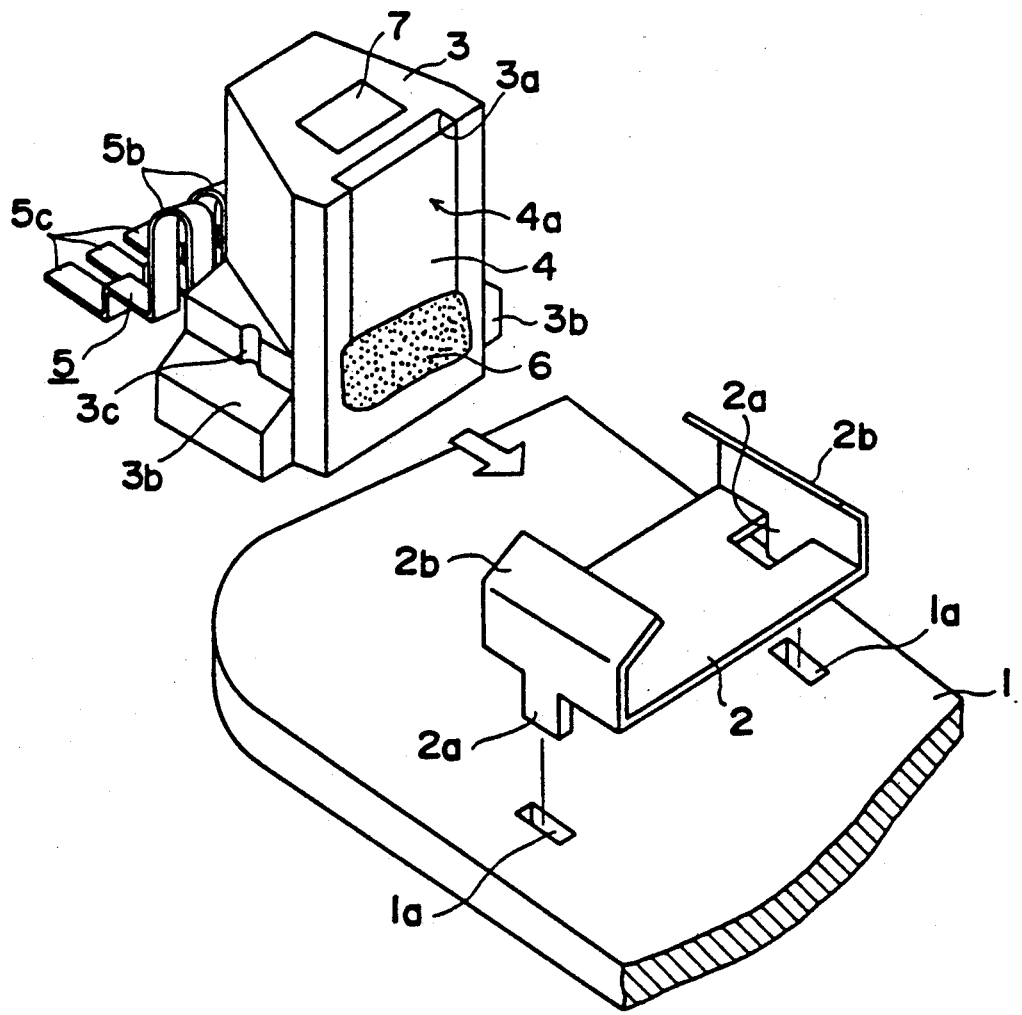

The arrangement of the present invention will be explained in detail below with reference to the embodiments shown in the accompanying drawings.

A holder for magnetic sensitive elements according to the present invention comprises: a movable holder 3 for holding a magnetic sensitive element 4 to which flexible signal input/output member 5, . . . , 5 are connected; a fixed holder 2 fixed to a board 1 for holding the movable holder 3; and a pair of guide means 2b, 3b for guiding the movable holder 3 for movement in one direction between the fixed holder 2 and the movable holder 3, such that the movable holder 3 is moved in a direction perpendicular to a magnetic sensitive surface 4a of the magnetic sensitive element 4.

Figure 6:
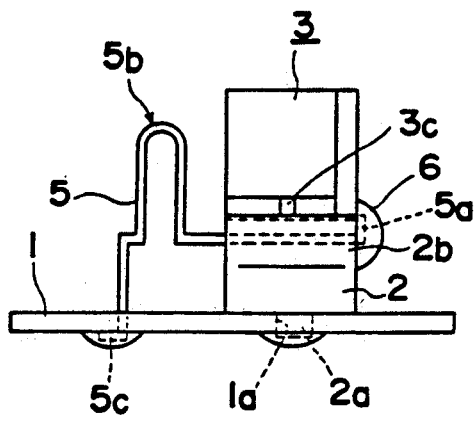

In the case of the illustrated embodiment, the fixed holder 2 is of a magnetic metal sheet made from a tin-plated iron sheet and bent formed into a configuration having a dovetail groove therein as shown. Guide portions 2b are formed in a manner inclined inwardly from the upper portions of the respective side walls of the fixed holder 2, thereby yielding an elastic nature therein structurally. Those guide portions 2b, therefore, serve to hold and guide the movable holder 3, allowing the same to move therein in one direction only. In the illustrated embodiment, an elasticity is structurally given to the guide portions 2b by way of bending them, but an elastic material such as spring steel may be employed. Projections 2a are formed on both sides of the fixed holder 2, respectively, so that they can be fitted into mating positioning through-holes 1a formed in the board 1 or the like. In the illustrated embodiment, the projections 2a are formed by being cut part-way and erected from the bottom of the fixed holder 2 and thus integral with the fixed holder 2. However, this arrangement is not exclusive and separately formed members analogous to the projections 2 may be fixed likewise to the bottom of the fixed holder 2. The fixed holder 2 is secured to the circuit board 1 by inserting the projections 2a into the respective through-holes 1a formed in the board 1, positioning them at a given point, and soldering a boundary A between the fixed holder 2 and the board 1 or the boundary between the board 1 and the leading end of each projections 2a as shown in FIG. 6. It is noted that the aforesaid movable holder's movement is effected in the fixed holder in a direction perpendicular to the magnetic sensitive surface 4a of the magnetic sensitive element 4 fixed to the entire surface of the movable holder 3. The material of the fixed holder 2 is not limited to a specific kind but, in terms of productivity, preferably, such a material should be used, which is solderable to the board 1, for example, an iron sheet plated with tin and other magnetic metallic sheets, magnetic powdered alloy, non-magnetic metal such as aluminum alloy, most preferably, a solderable magnetic metal plate which can assume an elastic structure.

The aforesaid movable holder 3 is bodily formed from a synthetic resin or the like, of an insulating nature, and guide portions 3b are formed integrally with the movable holder 3, projecting from the opposite sides thereof, respectively. The guide portions 3b engage with the respective guide portions 2b of the fixed holder 2 to constitute guide means. A recess 3a is formed on the frontal surface of the movable holder 3, and the magnetic sensitive element 4 is securely fitted in the recess 3a. The guide portions 3b include inclined surfaces which are slidingly movable with respect to the corresponding guide portions 2b of the fixed holder 2. The sliding direction is perpendicular to the magnetic sensitive surface 4a of the magnetic sensitive element 4. Adhesive reservoirs 3c are formed at locations above the respective guide portions 3b, whereby an adhesive agent is received in the reservoirs 3c so as to secure the movable holder 3c to the fixed holder 2. Also, a biasing magnet 7 is buried in the reverse side of the magnetic sensitive element 4 of the movable holder 3. The guide means, which is arranged between the aforesaid fixed holder 2 and the movable holder 3, is preferably of such material and configuration that can give the movable holder 3 an elastic pressing property or bias against the fixed holder 2 perpendicular to the movement of the fixed holder and at a degree sufficient to temporarily secure the movable holder 3 at an arbitrary position.

Figure 4:
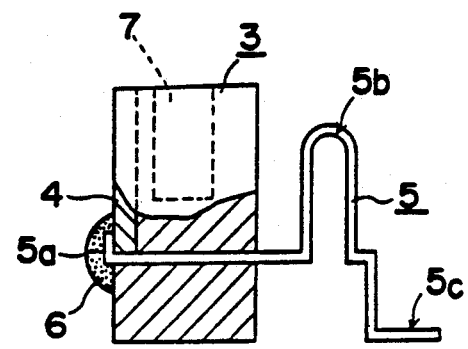

A plurality of flexible lead frames 5, . . . , 5 are secured to the movable holder 3 by means of an insert molding or the like, the frames being used as input/output members. In the illustrated embodiment, as shown in FIG. 4, the leading ends 5a of the respective lead frames 5 are bent upwardly and electrically connected to the front terminal portion of the magnetic sensitive element 4, while the other ends of the same project from the rear face of the movable holder 3 in a direction identical to the above-mentioned direction in which the movable holder 3 is moved. Those other ends of the lead frames 5 are so configured to permit their being secured to the circuit board 1. The portions of the respective lead frames 5, . . . , 5, which project from the movable holder 3, are formed into bent parts 5b and rear terminal parts 5c, wherein the latter 5c is soldered fast upon the circuit board 1. Thus, it is seen that, while the rear terminal portions 5c are secured to the board 1, the movable holder 3 remains movable owing to the flexibility of the lead frames 5 per se. The leading portions 5a of the respective lead frames 5 are electrically connected to the terminal portion of the magnetic sensitive element 4 and protected with a sealant 6.

Several examples, each having the similar holder for magnetic sensitive elements arranged in the above-described manner, and applied to a magnetic encoder, will now be explained below with reference to FIGS. 1 to 3 and 5.

Figure 3:
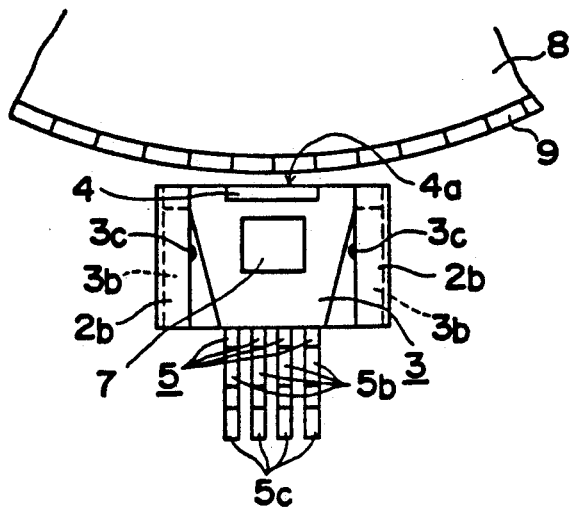
Figure 5:
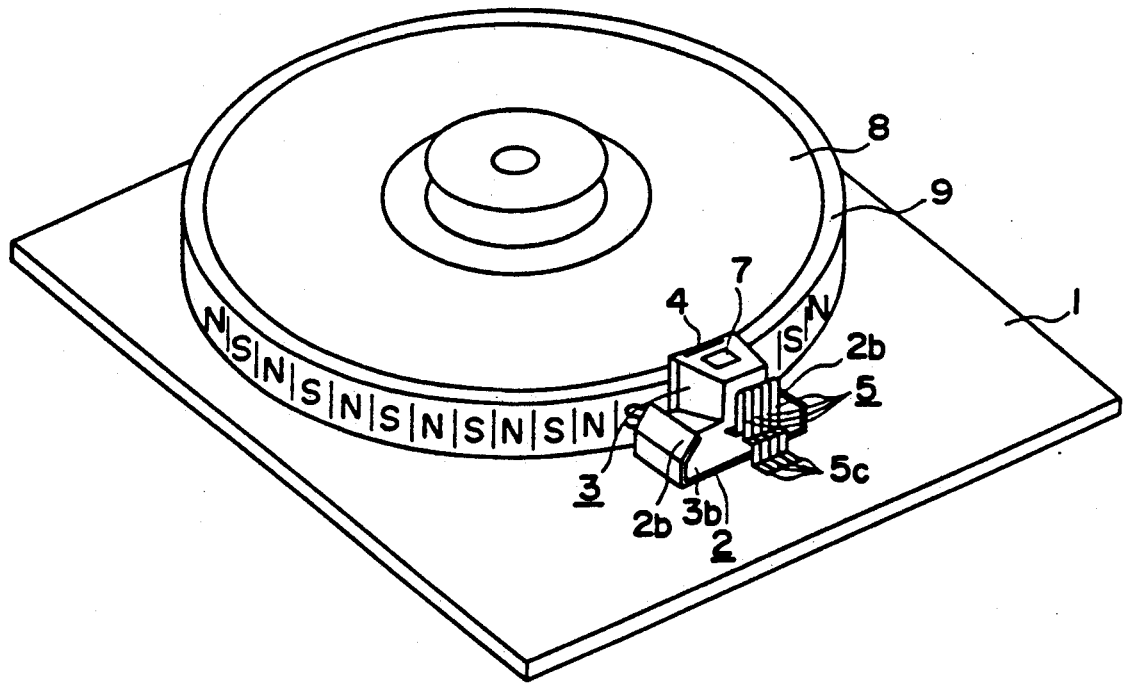

The holder for magnetic sensitive elements is secured at a predetermined position on the circuit board 1 by soldering or other fixing means. Positioning of the holder is accomplished by inserting the projections 2a of the fixed holder 2 into the corresponding through-holes 1a of the circuit board 1. The through-holes 1a are formed on the board 1 in a parallel relation with a tangent T of the magnetic recording medium 9. As shown in FIGS. 3 and 5, the magnetic drum 8 is rotatably disposed in front of the magnetic sensitive element 4 of the movable holder 3 incorporated in the fixed holder 2. Also, the drum 8 is provided on its outer periphery with the magnetic recording medium 9 having a series of alternating magnetic poles N and S thereabout.

In the above-described embodiment, the fixed holder 2 and the terminal portions 5c of the lead frames 5 are secured to the circuit-pattern side of the circuit board 1 by soldering. However, as shown in FIG. 6, the circuit pattern is formed on the reverse side of the board 1, and the projections 2a of the fixed holder 2 may be penetrated through the board 1 to project at the reverse side thereof and secured thereto by dip soldering or the like.

Now, hereinafter, a description will be made regarding the assembling of the magnetic sensitive element holder as well as the mounting of the same upon a circuit board, which are all related above.

Firstly, the movable holder 3, which holds the magnetic sensitive element 4, inserted into between the guide portions 2b of the fixed holder 2, and then, the guide portions 3b of the movable holder 3 are clamped within the guide portions 2b by applying the elastic pressing force of the latter to the former, so as to secure the movable holder 3 in a provisionally unmoved state.

Next, the projections 2a of the fixed holder 2 are inserted into the corresponding through-holes 1a of the circuit board 1 and located there in position. Then, soldering is effected, which preferably consists of an automatic or dip soldering, using a reflow oven, in order to fix to the circuit board 1 the boundaries A defined between the side faces of the fixed holder 2 and the board 1, and such is done also for fixing the terminal portions 5c of the lead frame 5 to the board 1. During such process, preferably, to bend flat the projections 2a passing through the through-holes 1a, 1a, of the board 1, before soldering them, will ensure preventing the fixed holder 2 against separation from the board, against fall therefrom, and against dislocation.

Then an adjustment is made for varying the gap between the magnetic sensitive element 4 and magnetic recording medium 9: The adjustment involves rotating the magnetic drum 8, displacing the movable holder 3, during such rotation, while observing output values of the element 4, until the values reach an optimum one. In this respect, the fixed holder 2 has been positioned unmoved in parallel with the tangent T of the magnetic recording medium 9, by means of which fixed holder 2, the movable holder 3 is retained for movement in a sole direction perpendicular to the tangent T of the magnetic recording medium 9. This permits movement of the magnetic sensitive surface 4a of the element 4 to be executed in a parallel relation with the recording medium 9, simply by moving the movable holder 3, thus facilitating the gap adjustment. The movable holder 3 in the illustrated embodiment is secured to the circuit board 1 by soldering together the circuit board 1 and the rear terminal portions 5c of the respective lead frames 5. However, the flexibility of bent portions 5b respectively of the lead frames 5, . . . , 5 enables the movable holder 3 to be moved freely toward and away from the magnetic recording medium 9.

As may be required, the element holder 3, to which is fixed the signal input/output member 5, may be retained on the fixed holder and subjected to a soldering upon the circuit board 1.

When the gap adjustment has been completed, the movable holder 3 and the fixed holder 2, which are temporarily secured by the elastic pressures applied from the guide portions 2b and 3b, are completely fixed in position by charging an adhesive between the corresponding guide portions 2b and 3b or by a mechanical fixing process such as caulking. In the case of fixation using the adhesive, the strength of adhesion can be increased by charging the adhesive into the adhesive reservoirs 3c.

Figure 7:
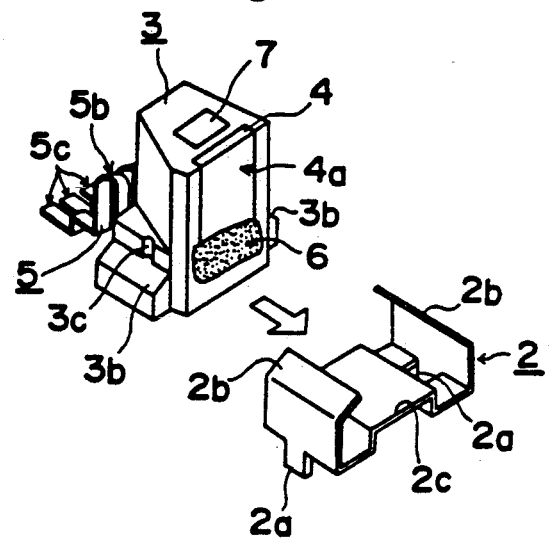

Although the aforesaid embodiment is a preferred embodiment of the present invention, various modifications can be employed without departing from the gist of the present invention. For example, as shown in FIG. 7, a platform-like projection 2c is formed at the bottom of the fixed holder 2, and the movable holder 3 may be mounted on the projection 2c. In this arrangement, the area of contact between the fixed holder 2 and bottom face of the movable holder 3 reduced is in comparison with the other embodiments described above, which therefore creates a less frictional, easy movement of the movable holder 3 during the gap adjustment. Additionally, it advantageously impedes heat conductivity in the soldering process for fixation of the fixed holder to the board 1.

Figure 8:
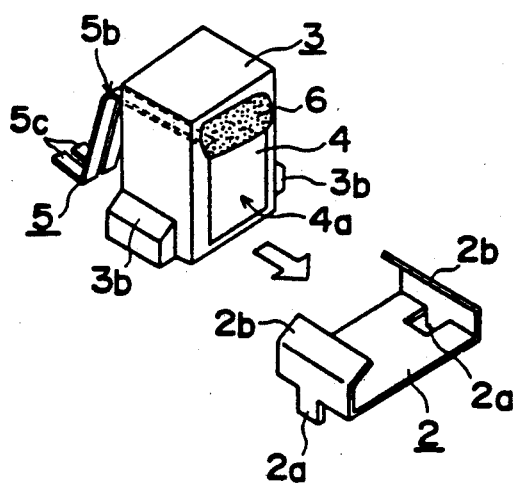
Figure 9:
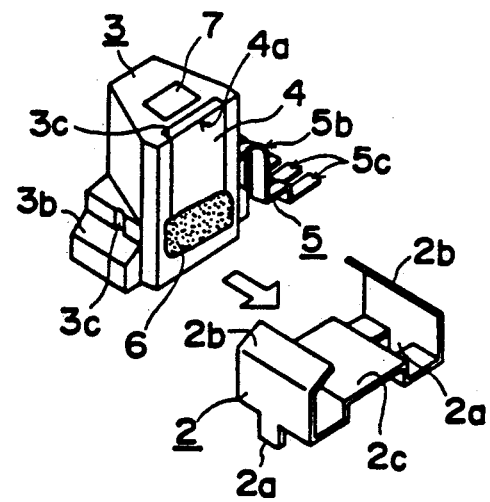

As needed, the lead frames 5, . . . , 5 may be so formed that it projects from the upper part of the reverse face of the movable holder 3, as shown in FIG. 8, or from one lateral wall of the movable holder 3, as in FIG. 9. In the holder structure shown in FIG. 9, it is essentially desired that the signal input/output element be made of a material having a non-directional flexibility, such as a lead wire, instead of the lead frames 5, . . . , 5 having unidirectional flexibility.

Figure 10:
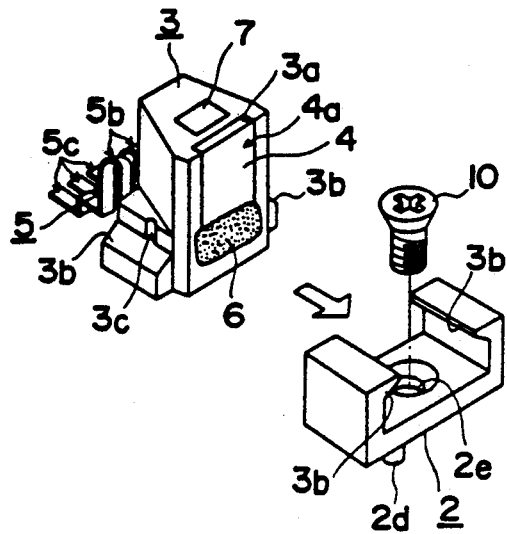

Referring to FIG. 10, the fixed holder 2 may be provided with a positioning pin 2d and a screw-mounting hole 2e. The fixed holder 2 may be fixed in position by means of the pin 2d being securely inserted in a positioning hole (not shown) formed in the circuit board 1, as well as by means of the machine screw 10 being drived into the board 1 through the screw-mounting hole 2e. The fixation of the holder 2, in this embodiment, being made by the screw 10 and pin 2d, permits use of an unsolderable material for forming the holder 2, for instance, a plastic material. The fixed holder 2 is, on the top ends of its respective lateral walls, formed with inwardly inclined guide portions 2d, to thereby define dovetail space or groove in which is accommodated the movable holder 2. It is noted that the fixed and movable holders 2, 3 may be made of the same material, for example, a resin material, in which case, they may have a same coefficient for thermal expansion, and thus, temperature does not affect the positioning of the holder, offering an improvement to the holder positioning or locating accuracy.

Figure 11A:
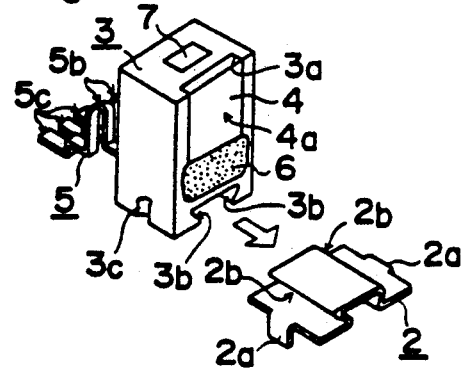
FIGS. 11A and 11B are perspective views showing holder structures according to other embodiments.
Figure 11B:
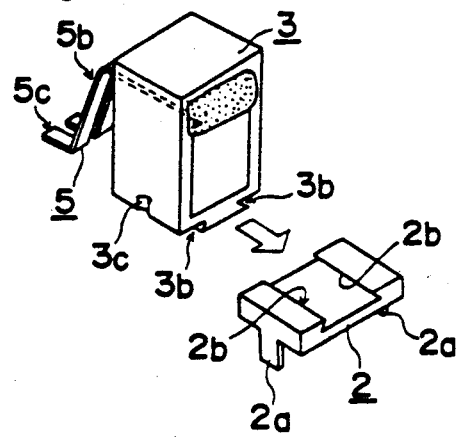
Figure 12:
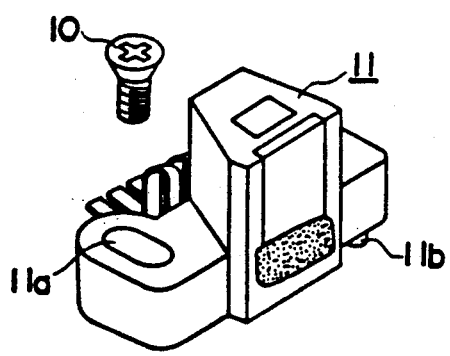
FIG. 12 is a perspective view showing another example of a conventional holder.
Figure 13:
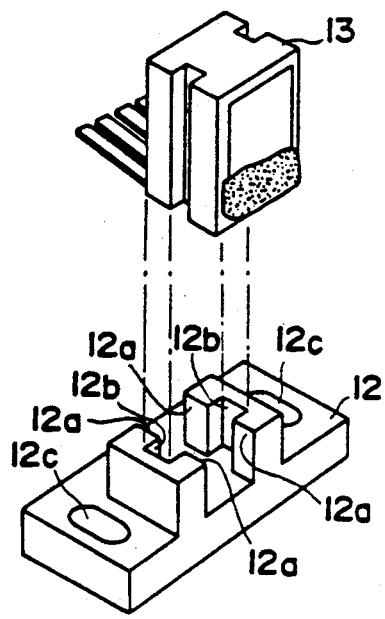
FIG. 13 is an exploded perspective view showing yet another conventional holder.
Figure 14:
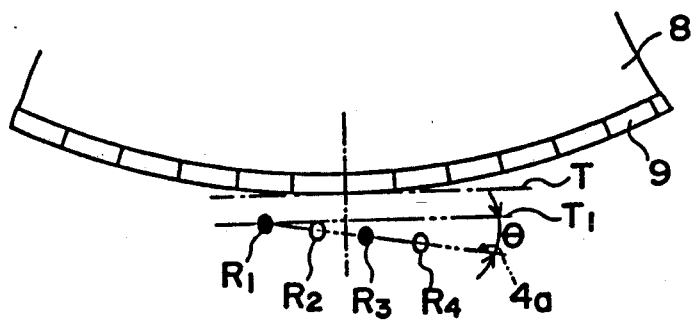
FIG. 14 is an explanatory view showing the relationship between a magnetic recording medium and a magnetic sensitive surface when gap adjustment is effected by means of a conventional holder for magnetic sensitive holders.
Figure 18:
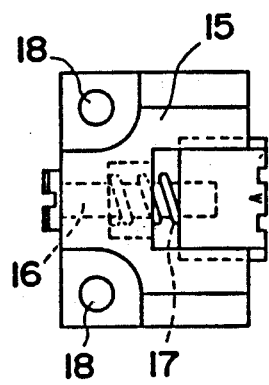
FIG. 18 is a plan view showing a conventional holder.
Figure 15:
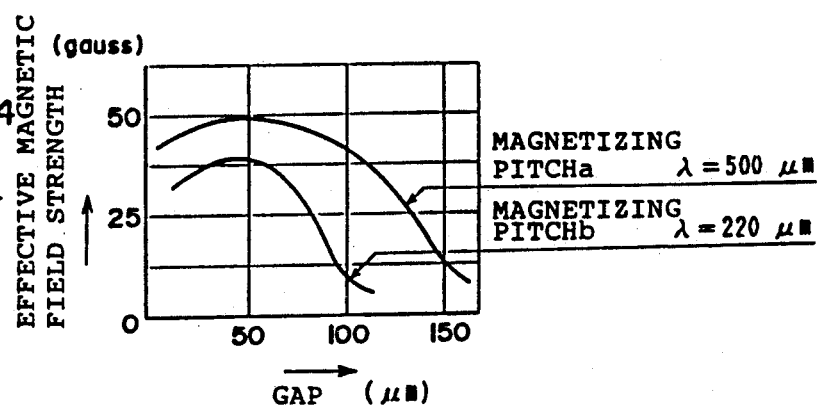
FIG. 15 is a graph showing the relationships between the gap, the effective magnetic field strength and a magnetizing pitch.
Figure 16:
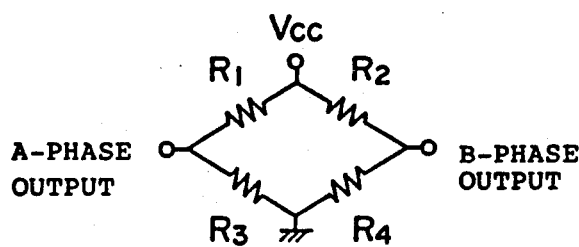
FIG. 16 is a connection diagram of the resistors of the magnetic sensitive element.
Figure 17:
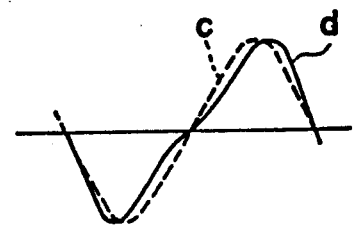
FIG. 17 is an output waveform diagram of the magnetic sensitive element.

As another mode for engaging together the movable and fixed holders 3, 2, a dovetail engagement means may be provided on both bottom surfaces of the movable and fixed holders 3, 2, in order to permit guiding and moving the movable holder 3 in one direction along the fixed holder 2. Reference is made to FIG. 11A, for instance, from which it can be seen that a magnetic metallic plate, forming the fixed holder 2, is formed such as to define two guide portions 2b which constitutes a male dovetail engagement part as illustrated, or otherwise a female one, whereas the bottom face of the movable holder 3 is formed with a mating female dovetail engagement part, or otherwise a male one, to define two guide portions 3b, whereupon, as indicated, engaging together those guide portions 2b, 3b results in retaining the movable holder 3 for movement in a direction perpendicular to the magnetic sensitive surface 4a. In this arrangement, the fixing of the movable holder 3 to the fixed holder 2 is accomplished by charging an adhesive between the side faces of the fixed holder 2 and the side faces of the movable holder 3 and into the adhesive reservoirs 3c. As shown in FIG. 11B, the fixed holder 2 may be a thin sheet fixed holder which is formed from the guide portions 2b made from male or female dovetails by machining such as cutting or extrusion. In this arrangement, since the fixed holder 2 is made of elastic material or since the guide portions 3b of the movable holder 3 have elasticity, predetermined elastic pressures can be produced between the guide portions 2b and 3b.

In the holder structure shown in FIGS. 11A and 11B, it suffices to form the positioning projections 2a with the fixed holder 2 equal in width to the movable holder 3. Accordingly, it is possible to make the entire holder compact.

We claim:

1. A holder for a magnetic sensitive element having a magnetic sensitive surface, said magnetic sensitive element being disposed in opposed relation to magnetic recording medium, with a gap provided therebetween, said holder comprising:

a movable holder which is connected to a flexible signal input/output member, said movable holder holding said magnetic sensitive element;

a fixed holder which is fixed to a board and formed from an elastic material, said fixed holder holding said movable holder in such a manner as to allow said movable holder to move in a direction perpendicular to said magnetic sensitive surface of said magnetic sensitive element, while simultaneously applying a first biasing force to said movable holder in a direction perpendicular to the line of movement of said movable holder for lateral movement relative to said fixed holder, simultaneous with a second biasing force applied perpendicular to said lateral movement of said movable holder by said fixed holder, and a guide means positioned between said movable and fixed holders, said movable holder thereby moving in a direction perpendicular to the magnetic sensitive surface of said magnetic sensitive element, said perpendicular direction to said magnetic sensitive surface, to permit adjustment of said gap between said magnetic sensitive element and said magnetic recording medium;

wherein said first and second biasing forces of said fixed holder act to normally retain said movable holder thereon, while permitting the same to be movable thereon, so that said movable holder may be moved and retained at a desired point for said gap adjustment on said movable holder in such a manner as to permit movement of said movable holder of said gap adjustment, so that said movable holder may be both movable and temporarily securable at a desired point.

2. The holder for magnetic sensitive elements according to claim 1, wherein a pair of right and left guide portions having inwardly inclined surfaces are formed on said fixed holder, while a pair of right and left guide portions having inclined surfaces which slide on said respective guide portions of said fixed holder are formed to project from said movable holder, and wherein said guide means is formed by fitting said guide portions of said movable holder between the guide portions of said fixed holder.

3. The holder for magnetic sensitive elements according to claim 1, wherein said fixed holder is formed of an elastic material, and wherein said guide portions of said movable holder are held by the elastic pressures applied by said guide portions of said fixed holder.

4. The holder according to claim 1, wherein said signal input/output member is so bent as to yield a flexibility for enabling movement of said movable holder, to thereby permit adjustment of a gap present between said magnetic sensitive surface and said magnetic recording medium.

5. The holder according to claim 1 wherein said guide means is formed by a guide portion of said fixed holder and a mating guide portion of said movable holder corresponding to said fixed holder guide portion, wherein both said guide portions of said fixed and movable holders are slidably engaged such that said movable holder may be moved back and forth for said gap adjustment, and wherein said biasing force is applied to said guide portion of said movable holder.

6. The holder according to claim 5, wherein an adhesive reservoir is formed in an upper portion of said guide portion associated with said movable holder.

7. The holder according to claim 1, wherein an adhesive reservoir means is formed in said guide means.

8. The holder according to claim 1, wherein said fixed holder is fixed to said board by soldering.

9. The holder according to claim 1, wherein said fixed holder is formed from a material selected from the group consisting of synthetic resin and a magnetic metallic sheet.

10. The holder according to claim 1, wherein both said movable and fixed holders are formed generally in a dovetail shape at their respective portions corresponding to said guide means.

11. The holder according to claim 1, wherein one of said movable and fixed holders is formed with a male dovetail engagement portion, whereas another of said movable and fixed holders is formed with a female dovetail portion; wherein said male and female dovetail portions constitute said guide means, and wherein both said movable and fixed holders are slidably engaged together at said male and female dovetail portions, such that one of said male and female dovetail portions produces said biasing force.

12. The holder according to claim 1, wherein said fixed holder is provided with a means for reducing the area of contact of said fixed holder with said movable holder.

13. The holder according to claim 12, wherein said reducing means comprises a platform-like projected portion formed at a bottom wall of said fixed holder.

14. The holder according to claim 11, wherein said fixed holder is provided with a positioning pin and a screw-mounting hole, and wherein said fixed holder is fixed in position upon said board by a machine screw driven into said board through said screw-mounting hole as well as by said positioning pin.

* * * * *